(Model.)
J. PORSCH, Jr.
COCK AND COUPLER FOR PIPES.
No. 248,346.  Patented Oct. 18, 1881.
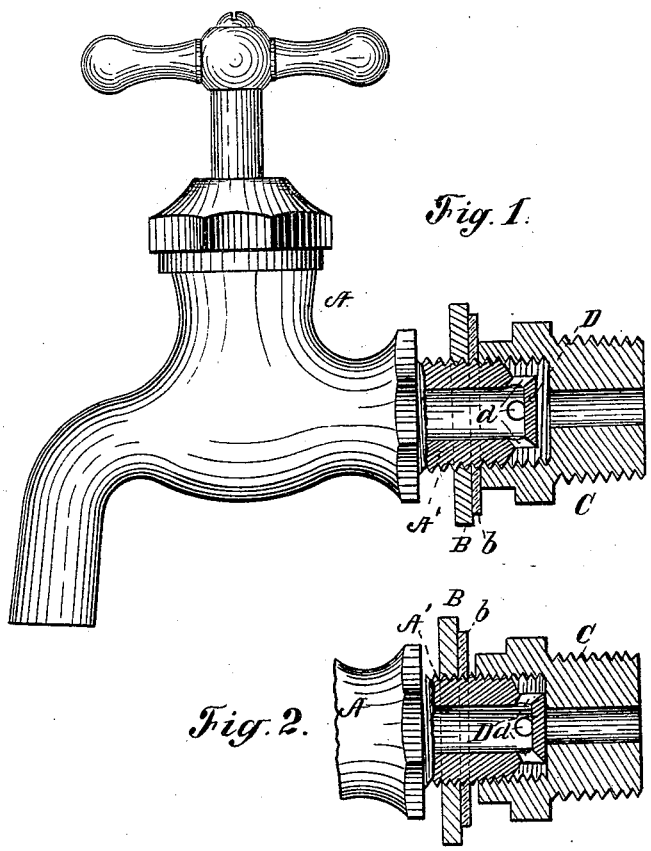
Witnesses
W. R. Edelen
Robt. H. Porter
Inventor
John Porsch jr
Hallock & Hallock
Att'ys

UNITED STATES PATENT OFFICE.

JOHN PORSCH, JR., OF ERIE, PENNSYLVANIA.

COCK AND COUPLER FOR PIPES.

SPECIFICATION forming part of Letters Patent No. 248,346, dated October 18, 1881.

Application filed April 14, 1881. (Model.)

*To all whom it may concern:*

Be it known that I, JOHN PORSCH, Jr., a citizen of the United States, a resident of Erie, in the county of Erie and State of Pennsylvania, have invented a new and useful Improvement in Cocks, Couplers, &c., for Water and other Pipes; and I do hereby declare that the following is a full, clear, and exact description thereof, reference being had to the accompanying drawings and the letters or figures of reference marked thereon.

My invention consists in providing a stopcock, faucet, or pipe-coupler with means whereby the fluid may be shut off within the same, so that the valve or any part beyond the shutoff may be repaired, and also whereby the flow of fluid through the same may be regulated.

My invention is illustrated in the accompanying drawings, as follows: Figure 1 shows my device, in vertical longitudinal section, in connection with a common stop-cock or faucet. Fig. 2 is a similar view of the same parts, but shows the cut-off as seated. Fig. 3 shows my device in connection with a coupler, also by a vertical longitudinal section.

The parts shown are as follows: A is the stop-cock or faucet, and is provided, as is usual, with a screw-threaded stem, A'. C is a socket-piece or connecting-piece, which screws into the part to which the faucet is to be connected, and receives the screw-threaded stem of the faucet, as is distinctly shown in Figs. 1 and 2. D is a cage upon the end of the stem A', $d\ d\ d$, &c., being the openings. The inner face of the part D, which comes opposite the opening in the socket-piece C, is solid, and is finished to seat tightly upon the seat provided within the socket-piece, and thereby close the opening through said part C, thus constituting a shut-off. In Fig. 1 these parts are not shown as seated, while in Fig. 2 they are.

B is a jam-nut, and $b$ an elastic washer.

If it is not desired to place the cage D upon the stem A' of the cock, a connecting-thimble, A'', may be used, as shown in Fig. 3. In such a construction the cock can be taken off at any time when the cage D is seated to shut off the water.

The device shown in Fig. 3 may be used as a coupler on a line of pipe, and when so used it will serve as a shut-off.

The operation is as follows: Suppose the parts to stand as shown in Fig. 1, and it is found necessary to repair the packing in the throttle-valve of the faucet; by loosening the jam-nut B the stem A', or, if used, the part A'', can be screwed far enough into the socket-piece C to seat the face of the cage D, as shown in Fig. 2, and shut off the flow. Then the valve in the faucet A can be removed and repaired, and if, in place of having the cage D on the stem of the valve, it is upon a separate piece, A'', as in Fig. 3, the whole cock A can be unscrewed and taken away for repairs, if necessary. The flow of water can be regulated by the distance the face of the cage D is left from the seat.

When the device is used as a shut-off in a line of pipe, as the construction shown in Fig. 3 may be—as, for example, in the water-pipes of any water-supply system—it can be placed so as to close any branch or service pipe.

What I claim as new is—

1. A stop-cock provided with a cage on the end of its attaching-stem, in combination with a coupler having a contained valve-seat, substantially as described.

2. In a cock or faucet connection or other coupler or joint in pipes or conduits wherein are provided means whereby, when the parts thereof are screwed together to the full limit, the opening through the same is closed, the combination therewith of means, substantially as shown, whereby said parts may be locked or fastened, when screwed together, at any point desired.

3. In a cock or faucet connection or other coupler or joint in pipes or conduits, the combination, substantially as shown, of the cage D, and seat therefor at the mouth of the orifice at the part C, and the jam-nut B.

In testimony that I claim the foregoing I have hereunto set my hand this 17th day of March, 1881.

JOHN PORSCH, JR.

Witnesses:
JNO. K. HALLOCK,
JAS. S. MILLER.